United States Patent
Leleve

(10) Patent No.: US 8,437,918 B2
(45) Date of Patent: May 7, 2013

(54) SYSTEM FOR THE DYNAMIC CORRECTION OF THE ORIENTATION OF A LIGHT SOURCE ON A VEHICLE AND THE ASSOCIATED METHOD

(75) Inventor: Joel Leleve, Epinay sur Seine (FR)

(73) Assignee: Valeo Vision, Bobigny (FR)

( * ) Notice: Subject to any disclaimer, the term of this patent is extended or adjusted under 35 U.S.C. 154(b) by 1014 days.

(21) Appl. No.: 11/937,803

(22) Filed: Nov. 9, 2007

(65) Prior Publication Data

US 2008/0114518 A1   May 15, 2008

(30) Foreign Application Priority Data

Nov. 10, 2006   (FR) ..................... 06 09857

(51) Int. Cl.
| | |
|---|---|
| B60R 22/00 | (2006.01) |
| B60Q 1/00 | (2006.01) |
| E05F 15/00 | (2006.01) |
| G05D 1/00 | (2006.01) |
| G05D 3/00 | (2006.01) |
| G06F 7/00 | (2006.01) |
| G06F 17/00 | (2006.01) |
| F21V 21/28 | (2006.01) |
| F21V 21/29 | (2006.01) |

(52) U.S. Cl.
USPC ............................... 701/49; 362/465

(58) Field of Classification Search ............ 701/49; 362/464, 465, 507
See application file for complete search history.

(56) References Cited

U.S. PATENT DOCUMENTS

| | | | |
|---|---|---|---|
| 6,229,263 B1 | 5/2001 | Izawa | |
| 6,476,707 B2 * | 11/2002 | Dietrich | ........................ 338/162 |
| 7,124,008 B2 | 10/2006 | Brun et al. | |
| 2001/0039469 A1 * | 11/2001 | Nishimura | ...................... 701/49 |
| 2004/0178738 A1 * | 9/2004 | Brun et al. | ...................... 315/82 |
| 2005/0083184 A1 * | 4/2005 | Bos et al. | ...................... 340/435 |

FOREIGN PATENT DOCUMENTS

| | | |
|---|---|---|
| DE | 19653662 A1 | 11/1997 |
| DE | 19902015 A1 | 7/2000 |
| EP | 0825063 A2 | 2/1998 |
| FR | 2848160 A1 | 6/2004 |
| GB | 2346436 A | 8/2000 |

\* cited by examiner

*Primary Examiner* — Thomas Tarcza
*Assistant Examiner* — Imran Mustafa
(74) *Attorney, Agent, or Firm* — Jacox, Meckstroth & Jenkins

(57) ABSTRACT

In the invention, a system is proposed for the automatic and dynamic correction of an orientation of a light beam emitted by a vehicle light source according to the attitude of the vehicle, by associating an image processing with static correction adapted to the slow variations in the attitude caused in particular by variations in load within the vehicle and an image processing with dynamic correction adapted to the rapid variations in the attitude due in particular to braking and acceleration of the vehicle, by means of a device for making the fusion of and filtering signals emitted simultaneously by the devices. A device for controlling the rotation of the light source orients the light source in a way appropriate to the driving according to the information received from the fusion and filtering device.

19 Claims, 2 Drawing Sheets

SYSTEM FOR THE DYNAMIC CORRECTION OF THE ORIENTATION OF A LIGHT SOURCE ON A VEHICLE AND THE ASSOCIATED METHOD

BACKGROUND OF THE INVENTION

1. Field of the Invention

The object of the present invention is a system for the dynamic correction of the orientation of a light source mounted on a motor vehicle, as well as a correction method using such a system. The system according to the invention is an optoelectronic system that makes it possible to instantaneously correct faulty orientation of a light beam emitted by a headlight device on the vehicle in question, in response to sudden variations in the attitude of the vehicle.

The field of the invention is in general terms that of lighting devices for vehicles travelling on the road such as for example cars and vehicles of the heavy goods type. More precisely, the invention concerns the orientation of the headlights of these vehicles.

2. Description of the Related Art

Optoelectronic correction means a correction performed by virtue of components that are transducers passing from electronic to optical or from optical to electronic. Currently all the vehicles travelling on the road have a device for illuminating the road used particularly at night or during bad weather. Conventionally there exists on motor vehicles in particular two types of lighting: lighting called "main beam", which illuminates the road entirely over a long distance, and lighting called "dipped beam", which illuminates the road over a short distance in order to avoid dazzling the drivers of the vehicles liable to come in the opposite direction or travelling in front.

In the case of dipped lighting, the range of the lighting is adjusted in particular by orienting the headlights in the vertical plane. Conventionally, the orientation of the light beam emitted by dipped headlights is adjusted by specialists, in particular automobile mechanics, according to information given by the manufacturer of the lighting device. The angle of orientation of the light beam is given by the manufacturer as a percentage of radians. This angle of orientation of the light beams is given for a vehicle in a standard position, which designates the position in which the chassis of the vehicle is substantially parallel to the road, that is to say the position in which the angle formed by the vehicle chassis with the horizontal plane is flat. It is then said that the attitude of the vehicle is flat. In general terms, the attitude of a vehicle corresponds to a measurement of the inclination of the vehicle with respect to the plane of the road that it is following.

However, it is known that the attitude of the vehicle may be modified according to the situation in which the vehicle is, in particular according to the loading of the vehicle. This is because, when the vehicle is highly loaded, the rear of the vehicle is lowered, which means that the front of the vehicle is raised. The vehicle is therefore no longer parallel to the road. In this case, the light beams from the dipped headlights of the vehicle are directed towards the horizon instead of being directed towards the road. They may then dazzle the drivers of vehicles coming in the opposite direction or travelling in front.

It will thus be understood that the initial adjustment of the dipped headlights, carried out for a vehicle in the standard position, is not correct when the attitude of the vehicle is no longer flat.

To resolve this drawback, some vehicles are equipped with an automatic correction system fixed to the vehicle chassis. This system comprises sensors placed on the front and rear axles of the vehicle and which each measure the difference in height between the position of the wheel and the chassis, according to the loading of the vehicle. A small computer integrated in the automatic correction system determines the attitude of the vehicle and gives information to small motors that orient the headlights. However, this system has drawbacks. This is because the sensors are placed at a short distance from the wheels, that is to say at places that are difficult for a person or robot to access when the vehicle is being manufactured. Thus the operation of fitting the sensors, during the manufacture of the vehicle, requires great precision and consequently considerable investment in time and money. In addition, these sensors are subjected to splashing of water, gravel and other elements that may be situated on the road. The connections to these sensors and the sensors themselves must therefore be robust in order to withstand such splashing.

To meet these drawbacks, optoelectronic correction systems have recently been proposed. For example, the French patent published under the number FR 02 15874, which is equivalent to U.S. Publication Number 2004/0178738, proposes a system for controlling the orientation of the headlights of a vehicle from a camera and a specific point in the light beam, according the attitude of the vehicle. This system consists of fixing a camera to the vehicle, or using a camera already in place in the vehicle, in order to film the road extending in front of the vehicle. An image processing unit then processes at least one image in order to determine the horizon line of the scene situated in front of the vehicle. From this horizon line, it is possible to determine a specific point in the scene and then to adjust the headlight until a specific light spot emitted by a light emission source mounted on the headlight reflector is merged with the specific point. In certain embodiments, the light emission source is of the infrared type, just like the camera used.

FIG. 1 depicts schematically an example embodiment of the system 100 controlling the orientation of a vehicle headlight according to the patent published under FR 02 15874. The scene unfolding in front of the running vehicle is filmed by a camera 101 oriented towards the front of the vehicle. In other examples, the camera 101 is oriented towards the rear of the vehicle, without the system described here having to undergo any significant modifications. The camera 101 can possibly be used for implementing functions other than those relating to the object of the patent FR 02 15874. The camera 101 is advantageously adapted to photographing at night, for example by being of the infrared type. A device for static correction for correcting of the orientation of light source in response to variations in the attitude of the vehicle 102, including in particular a first unit for processing the images acquired—or captured—by the camera 101, produces a first set of information relating to a static measurement of the vehicle attitude, that is to say an average measurement of the attitude over a period of several seconds.

A device 103 for controlling the rotation of a light source 104 controls the orientation of the headlights 104A and 104B in a suitable fashion according to the information received from the device for static correction in response to sudden variations in the attitude of the vehicle 102.

The headlight 104A emits a first light beam 105A towards the front of the vehicle. The headlight 104B emits a second light beam 105B which is able to project a specific light spot onto the road. The connectedness of the headlights 104A and 104B enables them to move simultaneously from an angular point of view. The movements of the light beams 105A and 105B result in a light sweep 106 of predetermined amplitude.

The static correction device is characterized by a long time constant. Long time constant means the fact that the device 102 produces information from images that are spaced apart in time, even though an economically accessible camera has an image acquisition frequency of around 30 images per second. This is because the road scene filmed is often disturbed, for example by the presence of other vehicles appearing and disappearing from the captured images, or by the existence of disturbing environments such as pebbles and irregularities on the roadway, which generate uncertainties in the calculation of the horizon line and impose a relatively long filtering time compared with the image sampling frequency of the camera.

Thus such a system makes it necessary to accept less great precision in order to obtain a shorter response time, without ever attaining a satisfactory response time, for example around 0.2 seconds, desirable when a rapid variation in attitude is observed. This is why the system presents risks of error that may lead to uncomfortable or even dangerous situations for the driver, these situations being related to excessive and/or ill-timed correction amplitudes. It is moreover totally unsuited to a dynamic correction in response to variations in the attitude. Such a dynamic correction designates a correction for compensating the attitude that results in an intervention on the orientation of at least one light source, which is carried out very rapidly, that is to say in times of around 0.2 seconds. Such a correction makes it possible to adapt to the rapid variations in attitude that are observed during abrupt acceleration or braking stages.

What is needed, therefore, is a system and method that provides dynamic correction of the orientation of a light source and that overcomes one or more problems of the prior art.

SUMMARY OF THE INVENTION

One of the essential objects of the invention is to propose a correction system for the orientation of a headlight that meets the problem that has just been disclosed. For this purpose, the correction system according to the invention proposes to produce a processing of complementary images in which the instantaneous movement of the images captured by the camera is analyzed in order to determine abrupt variations in framing revealing appreciable braking or acceleration stages that immediately influence the attitude of the vehicle. Advantageously, a vertical movement signal between two consecutive images is delivered in real time and makes it possible to detect such stages.

To this end, it is possible to use for example specific software applications of the type present in camcorders for performing image stabilization operations. The processing of complementary images then makes it possible to obtain dynamic correction information which, combined with the static correction information available in systems of the prior art, makes it possible to obtain an appropriate correction signal for performing a rapid correction. The solution proposed by the invention has no significant effect on the overall cost of the orientation correction system of the headlight devices in question.

Thus, in the invention, a system for the automatic and dynamic correction of an orientation of a light beam emitted by a vehicle light source according to the attitude of the vehicle is proposed, by associating an image processing with static correction adapted to the slow variations in the attitude caused in particular by variations in load within the vehicle and an image processing with dynamic correction adapted to the rapid variations in the attitude due in particular to braking and acceleration of the vehicle, by means of a device for making the fusion of and filtering signals emitted simultaneously by the devices. A device for controlling the rotation of the light source orients the headlights in a fashion appropriate to the driving according to the information received from the fusion and filtering device.

Static correction system means a correction relating to the attitude of the vehicle at rest or a correction with a long time constant (for example two minutes). Preferentially, in the present invention, the static correction system has a long time constant.

It should be noted that the static correction device can also relate to a technology based on the travel time for the light between the emission source and the photosensitive receiver after this light has been reflected by the road surface. The static correction device can also use potentiometric sensors fixed to the chassis of the vehicle and each measuring the angle formed with this chassis by an arm whose end is pivotally mounted on the chassis and whose other end is connected to an element vertically secured to the associated wheel.

The invention concerns a system for correcting the orientation of a light source of a vehicle according to the attitude of the vehicle, the system comprising in particular:
- a camera mounted in the vehicle for acquiring a succession of images representing a road scene unfolding in front of or behind the vehicle;
- a device for static correction of the orientation of the light source in response to the vehicle attitude involving in particular a first unit for processing the images acquired by the camera and producing a first set of information relating to a static measurement of the vehicle attitude;

wherein the correction system also comprises:
- a second unit for processing images acquired by the camera, producing a second set of information relating to a measurement of deviation of a framing of the images acquired;
- a data fusion device for combining the first set of information and the second set of information and producing light source orientation correction information.

Apart from the main characteristics that have just been mentioned, the system according to the invention can have one or more additional characteristics among the following; any combination of these additional characteristics, provided that they are not mutually exclusive, constitute an object of the invention:
- the device for static correction comprises a device for emitting a specific light spot;
- the second set of information produced by the second image processing unit relates to a measurement of vertical deviation of the framing of the image;
- the second image processing unit comprises means for performing an operation of detecting and following at least one particular point present on the acquired images;
- the particular point on the image corresponds to a corner of the element of the road scene;
- at least one of the particular points is selected in a lateral peripheral zone of the captured images;
- the particular point corresponds to the projection of the specific light spot visible on the acquired images;
- the static correction device involves a first unit for processing the images acquired by the camera;
- the static correction device relates to technology based on the travel time of the light between the emission source and the photosensitive receiver after this light has been reflected by the road surface;

the static correction device uses potentiometric sensors fixed to the vehicle chassis and each measuring the angle formed with this chassis by an arm whose end is pivotally mounted on the chassis and whose other end is connected to an element vertically secured to the associated wheel.

The present invention also relates to a method of correcting the orientation of a light source of a motor vehicle according to the attitude of the said vehicle, the said method comprising the following steps:

capturing a set of images of a road scene unfolding in front of or behind the vehicle;

producing, from the captured images, a signal for static correction of the orientation of the light source in response to the attitude of the vehicle;

wherein the method comprises the various additional steps consisting of:

producing a signal for dynamic correction of the orientation of the light source in response to the attitude of the vehicle by performing an operation of measuring the deviation in the framing of the captured images;

making the fusion of the static correction signal and the dynamic correction signal in order to obtain a correction signal;

orienting the light source according to the correction signal.

Apart from the main characteristics that have just been mentioned in the previous paragraph, the method according to the invention can have one or more additional characteristics among the following; any combination of these additional characteristics, provided that they are not mutually exclusive, constitute an object of the invention:

the step comprising producing the dynamic correction signal comprises the operation consisting of identifying a rapid change in attitude;

the step comprising producing the dynamic correction signal comprises the operation comprising quantifying an amplitude of the rapid change in attitude;

the step comprising producing the dynamic correction signal comprises the operations comprising detecting and following a particular point on the captured images;

the step of producing the static correction signal comprises the various operations comprising:

emitting a specific light spot on the road scene;

comparing, on the captured images, the position of the specific light spot emitted and the position of a specific point on the road scene situated at a previously fixed distance from a previously determined horizon line;

the particular point corresponds to the projection of the specific light spot visible on the captured images;

the particular point corresponds to a corner of an element of the road scene.

Finally, the present invention relates to a motor vehicle characterized in that it comprises a system for correcting the orientation of a light source having the main characteristics and possibly one or more supplementary characteristics previously mentioned.

The invention and its various applications will be better understood from a reading of the following description and an examination of the figures accompanying it.

These are presented only by way of indication and are no way limitative of the invention.

BRIEF DESCRIPTION OF THE ACCOMPANYING DRAWINGS

DETAILED DESCRIPTION OF THE ILLUSTRATIVE EMBODIMENT

Figure 2:
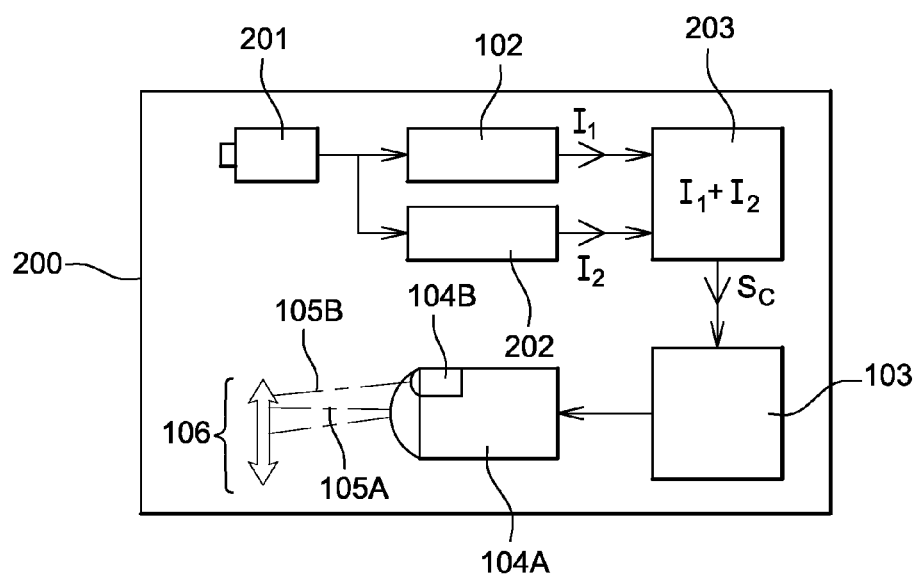
FIG. 2 is a schematic representation of an example embodiment according to the invention of a system for dynamic correction of the orientation of a light source of a vehicle.
Figure 3:
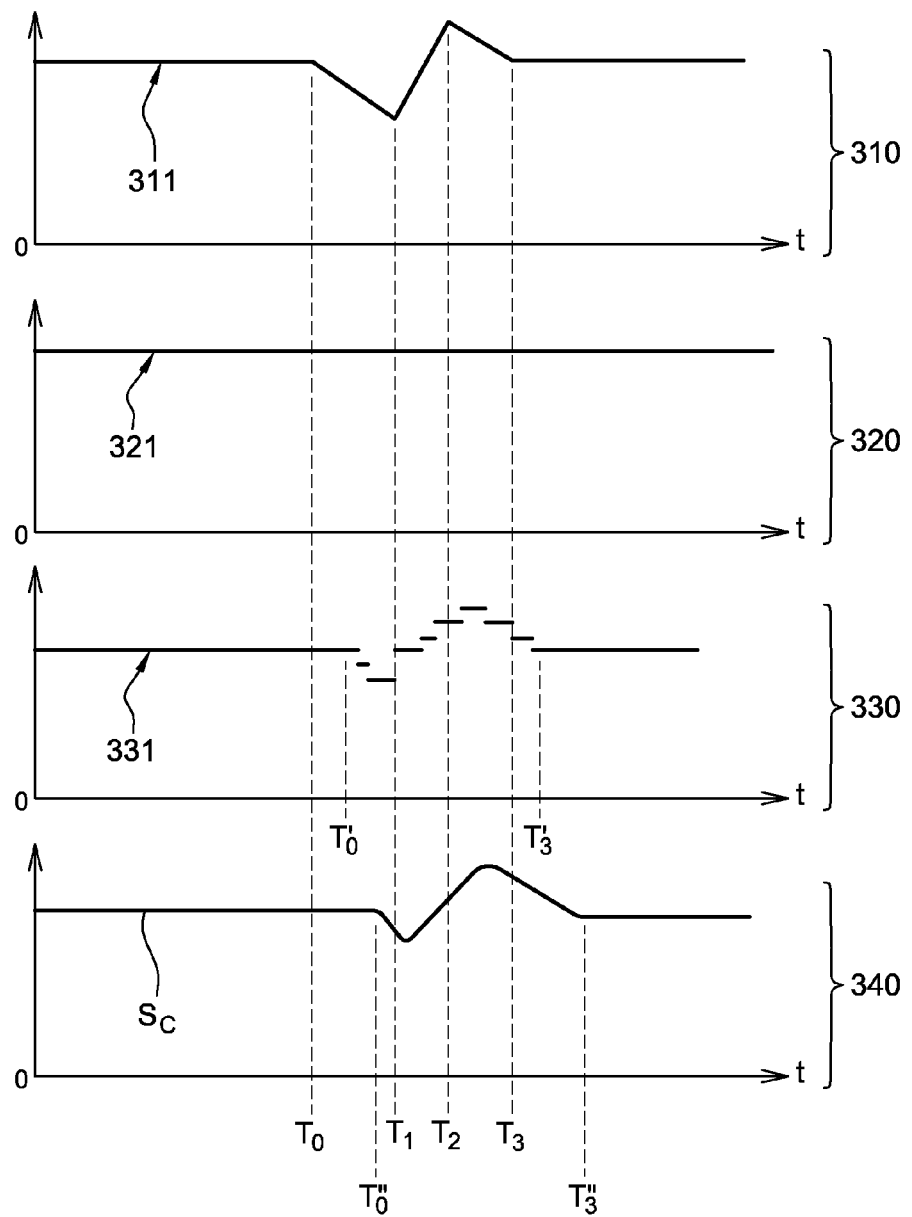
FIG. 3 are various timing diagrams illustrating the production of a correction signal involved in the system and method according to the invention.

The various elements appearing in several figures will, unless specified otherwise, have kept the same reference number. FIGS. 2 to 3 illustrate an example embodiment of the system according to the invention and its implementation.

FIG. 2 shows an example embodiment of a system 200 according to the invention, stored on or in a vehicle, for correcting the orientation of a light source of the vehicle, represented here by the headlight 104A. In the system 200, a camera 201 acquires a succession of images representing a road scene. The camera 201 can be installed within the vehicle or secured to the vehicle outside it. It may for example be similar to the camera 101 used in the system of the prior art described with reference to FIG. 1. In particular it may be of the infrared type. It is possible to use a camera already installed in the vehicle for performing other functions such as the functions relating to night vision or the detection of obstacles. The road scene filmed may correspond either to what is visible in front of the vehicle or to what is visible behind the vehicle.

Figure 1:
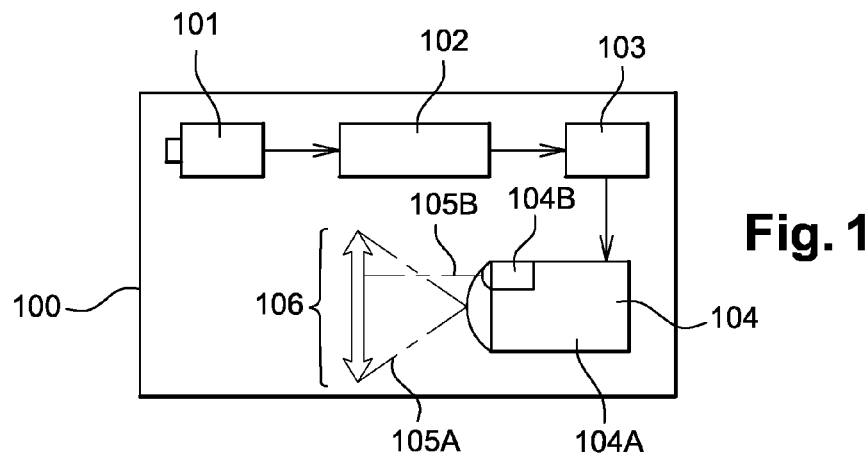
FIG. 1 is a schematic representation of an example embodiment of a system controlling the orientation of a vehicle headlight of the prior art.

In the system 200 there is the static correction device 102 already present in FIG. 1. It produces a first set of information I1 relating to a static measurement of the vehicle attitude. In other example embodiments, other static correction devices can be used in replacement for the device 102. The device 102 is supplemented by a dynamic correction device 202. The devices 102 and 202 both receive the images acquired by the camera 201. The dynamic correction device 202 includes a second image processing unit. It produces a second set of information I2 relating to a dynamic measurement of the vehicle attitude.

The second image processing unit is able to detect a rapid variation in the framing of the images acquired. Such a variation may for example be due to significant acceleration or braking of the vehicle, the orientation of the headlight device 104A then no longer being suited to optimum lighting if only the static correction is implemented.

To detect such variation in framing, several solutions are possible. By way of example, it is possible to perform an operation of following zones of captured images corresponding to corners of visible elements on the images captured. For this purpose, the image processing unit detects the presence of at least one corner on a first captured image. "Corner" means a zone of the image that can easily be located by an abrupt variation in contrast along the horizontal and vertical axes of the image.

Brightness gradient calculations along a first horizontal axis, the plane defined by the road being considered to be horizontal, and along a second vertical axis, may for example be used. Advantageously, the corner detection operation takes place in vertical lateral bands of the image, forming a part of the periphery of the image, and covering approximately twenty five percent of the total image. Locating corner developments of the scene that correspond to non-moving elements present on the edge of the road is thus highly probable. These points change slowly and evenly in the captured images successively according to the stabilized forward movement of the vehicle. In the event of abrupt change in attitude, these points rise of fall abruptly. This phenomenon is easy to identify and to quantify by performing an operation of vertical following of the located corners. In the invention, it is possible in fact to be limited to a vertical following of the change in particular points detected on the image, a variation in attitude occurring only on the vertical component of the points of the image, which reduces the cost of the algorithms involved and the duration of processing. The dynamic correction device 202 can then instantaneously supply an additional correction to the static correction made by the device 102.

In order to further facilitate and accelerate the calculations involved in the second image processing unit 202, it is possible merely to detect and follow a single point. Such a single point may for example be one of the corners detected. In another example embodiment of the invention, such a single point corresponds to the projection of the specific light spot emitted by the source 105-B and visible in the acquired images.

A data fusion device 203 receives the first set of information I1 and the second set of information I2 from which it produces dynamic correction information that it transforms into a correction signal Sc. Such a fusion of information makes it possible to obtain a correction, an essential advantage of which is to respond firstly to the slow variations in attitude of the vehicle caused in particular by variations in load, and secondly to the rapid variations in attitude of the vehicle due in particular to braking and acceleration.

The rotation control device 103 of the light source 104 then orients the headlight device 104 in a suitable fashion according to the correction signal Sc.

FIG. 3 depicts various timing diagrams illustrating the production of the correction signal involved in the system and method according to the invention.

A first timing diagram 310 corresponds to the natural variations in attitude of the vehicle as a function of time during a vehicle braking operation. In this way there is first observed a signal 311 constant between times 0 and T0 corresponding to the nominal value of the attitude, or flat attitude, of the vehicle before braking thereof. The vehicle brakes at time T0, which instantly causes a reduction in the attitude value until time T1; the brake is then released, the consequence of which is to increase the attitude value beyond its nominal value until a time T2; as from time T2, the vehicle progressively regains its normal orientation, a normal orientation that it regains at time T3, where the attitude resumes its nominal value.

A second timing diagram 320 shows a signal 321 corresponding to the static correction information I1 produced by the static correction device 102. Because a large number of images, significantly spaced apart in time, are taken into consideration for calculating the first set of information I1, the variation in attitude observed on the first timing diagram is not represented by any static correction signal: the time necessary for acquiring the images and processing them is too great to react in the face of such an abrupt change in attitude.

A third timing diagram 330 corresponds to the vertical movements of images observed and processed by the second image processing unit of the dynamic correction device 202. The device 202 thus emits a signal 331 in stages, corresponding to the second set of information I2, representing, in terms of number of lines visible on the acquired images, the rapid variations in attitude of the vehicle due in particular to braking and accelerations; the delay observed between the braking, at time T0, and the production of information relating to this braking at time T0' is not significant, being less than 0.2 seconds. Such an insignificant delay is found again at the end of processing, between times T3 and T3' marking the return of the signal 331 to a flat attitude value.

A fourth timing diagram 340 corresponds to the correction signal Sc obtained by adding the timing diagrams 320 and 330, taking the flat attitude value as the reference value. The correction signal then always has an insignificant delay with respect to the event that gave rise to it, the braking shown in the timing diagram 310. This delay, observed between times T0 and T0", the time marking the start of the variation in the correction signal, or between times T3 and T3", the time marking the end of the variation in the correction signal, remains less than 0.2 seconds; it is due to the various image acquisition and calculation operations taking place in order to achieve the fusion of the sets of information I1 and I2. This delay is therefore entirely satisfactory for proposing a dynamic correction for the orientation of a light source of the vehicle.

While the system and method herein described constitute preferred embodiments of this invention, it is to be understood that the invention is not limited to this precise system and method, and that changes may be made therein without departing from the scope of the invention which is defined in the appended claims.

What is claimed is:

1. A system for correcting the orientation of a light source of a vehicle according to an attitude of said vehicle, said vehicle having a camera mounted in the vehicle for acquiring a succession of images representing a road scene unfolding in front of or behind the vehicle and a static correction device for static correction of the orientation of the light source in response to said attitude of said vehicle, and a first image processing unit producing a static signal corresponding to a first set of information relating to a static measurement of said attitude of said vehicle, said system comprising:

a dynamic correction device for dynamic correction of the orientation of the light source in response to said attitude of said vehicle, said dynamic correction device having a second image processing unit for processing said succession of images acquired by the camera and producing a dynamic signal corresponding to a second set of information to respond to rapid variations in said attitude of said vehicle and further relating to a measurement of vertical movements and deviation of a framing of said succession of images acquired; and a data fusion device for combining said static signal corresponding to said first set of information and said dynamic signal corresponding to said second set of information and producing a light source orientation correction signal to correct the orientation of the light source to enable both a response to slow variations in said attitude of said vehicle and rapid variations in said attitude of said vehicle;

wherein said light source orientation correction signal comprises a delay that begins when said rapid variations in said attitude of said vehicle begin and said dynamic signal having a dynamic correction signal delay that also begins when said rapid variations in said attitude of said vehicle starts, said light source orientation correction signal delay being greater than said dynamic correction signal delay.

2. The system for correcting the orientation of a light source according to claim 1, wherein the static correction device for the static correction comprises a device for emitting a specific light spot.

3. The system for correcting the orientation of a light source according to claim 1, wherein the second set of information produced by said image processing unit relates to a measurement of vertical deviation of the framing of said succession of images.

4. The system for correcting the orientation of a light source according to claim 1, wherein said first image processing unit comprises means for performing an operation of detecting and following at least one particular point present on said succession of images acquired.

5. The system for correcting the orientation of a light source according to claim 4, wherein said at least one particular point of the image corresponds to a corner of an element of the road scene.

6. The system for correcting the orientation of a light source according to claim 4, wherein said at least one particular point is selected in a lateral peripheral zone of said succession of acquired images.

7. The system for correcting the orientation of a light source according to claim 4, wherein the device for the static correction comprises a device for emitting a specific light spot and said at least one particular point corresponds to the projection of the specific light spot visible on said succession of images acquired.

8. The system for correcting the orientation of a light source according to claim 1, wherein the static correction device involves a first unit for processing the images acquired by the camera.

9. The system for correcting the orientation of a light source according to claim 1, wherein the static correction device involves a technology based on the travel time of the light between the emission source and the photosensitive receiver after this light has been reflected by the road surface.

10. The system for correcting the orientation of a light source according to claim 1, wherein the static correction device uses potentiometric sensors fixed to the vehicle chassis and each measuring the angle formed with this chassis by an arm, one end of which is pivotally mounted on the chassis and the other end of which is connected to an element vertically secured to the associated wheel.

11. The system for correcting the orientation of a light source according to claim 1, wherein the static correction device is a correction device with a long time constant.

12. A motor vehicle, which comprises a system for correcting the orientation of a light source according to claim 1.

13. A system for orienting a light source of a motor vehicle having a camera mounted on the vehicle for capturing a plurality of images outside the vehicle and a light source control device coupled to said light source for orienting said light source and a first image processing unit for receiving at least one image from said camera and for generating a static signal corresponding to a static measurement relating to an attitude of said vehicle, said system comprising:

a dynamic correction device for dynamic correction of the orientation of the light source in response said attitude of said vehicle, said dynamic correction device having a second image processing unit for processing a plurality of images received from said camera and for generating a dynamic signal corresponding to a deviation and vertical movement of said plurality of images measurement of a framing of said plurality of images; and a data fusion device coupled to said light source control device for receiving said static signal corresponding to said static measurement and said dynamic signal corresponding to said deviation measurement and for generating an orientation correction signal in response thereto;

said light source control device receiving said orientation correction signal to correct the orientation of the light source and adjusting an orientation of said light source in response to both slow variations in said attitude of said vehicle and rapid variations in said attitude of said vehicle and said orientation correction signal;

wherein said light source orientation correction signal comprises a delay that begins when said rapid variations in said attitude of said vehicle begin and said dynamic signal having a dynamic correction signal delay that also begins when said rapid variations in said attitude of said vehicle starts said light source orientation correction signal delay being greater than said dynamic correction signal delay.

14. The system as recited in claim 13 wherein said first unit comprises a device for emitting a light spot that may be captured by said camera.

15. The system as recited in claim 13 wherein said deviation measurement relates to a measurement of a vertical deviation of a framing of said at least one image.

16. The system as recited in claim 13 wherein said image processing unit comprising means for performing an operation of detecting and following at least one particular point present on said plurality of images.

17. The system as recited in claim 16 wherein said at least one particular point is selected in a lateral peripheral zone of said plurality of images.

18. The system as recited in claim 16 wherein said at least one particular point comprises a corner of an element of a road scene in front of the vehicle.

19. The system as recited in claim 1 wherein the system comprises:
said camera mounted in the vehicle;
said static correction device; and
said first image processing unit.

* * * * *